United States Patent [19]

Kuchenbecker et al.

[11] 3,885,341
[45] May 27, 1975

[54] GYPSY MOTH TRAP

[75] Inventors: Morris William Kuchenbecker; Walter John Oppermann, both of Neenah, Wis.

[73] Assignee: American Can Company, Greenwich, Conn.

[22] Filed: Mar. 28, 1974

[21] Appl. No.: 455,860

[52] U.S. Cl. .................................. 43/65; 43/121
[51] Int. Cl. ..................... A01m 1/10; A01m 23/08
[58] Field of Search ....... 43/65, 121, 100, 107, 132, 43/131, 64, 122, 66

[56] References Cited
UNITED STATES PATENTS

| | | | |
|---|---|---|---|
| 1,128,946 | 2/1915 | Blum | 43/121 |
| 1,621,318 | 3/1927 | Edwards et al. | 43/121 |
| 1,634,648 | 7/1927 | Cardinet | 43/121 |
| 2,000,193 | 5/1935 | Schroder | 43/121 |
| 2,345,408 | 3/1944 | Martin | 43/107 |
| 3,318,039 | 5/1967 | MacDonald et al. | 43/100 |

*Primary Examiner*—Warner H. Camp
*Attorney, Agent, or Firm*—Robert P. Auber; George P. Ziehmer

[57] ABSTRACT

A housing has a base and a multiplicity of apertures in the sides thereof, recessed frusto-conical entry ports engaged within the apertures having a multiplicity of radial, flexible fingers inwardly directed for easing entry into and impeding egress from the housing, means for covering and supporting the top of the housing and providing a shaded area adjacent the entry ports, and an attractant situated within the housing to attract the moths through the entry ports into the housing.

8 Claims, 3 Drawing Figures

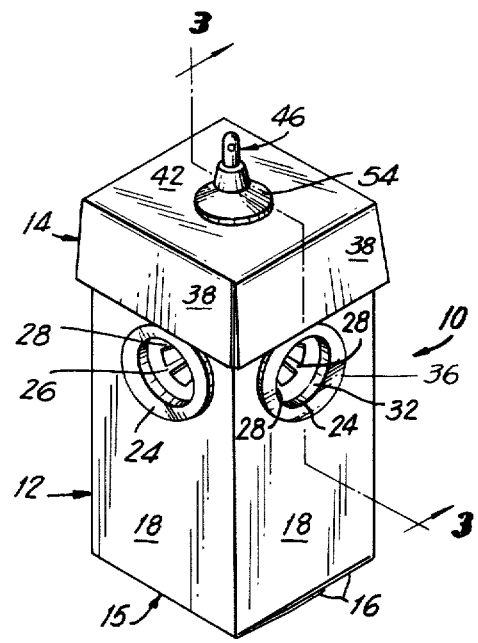
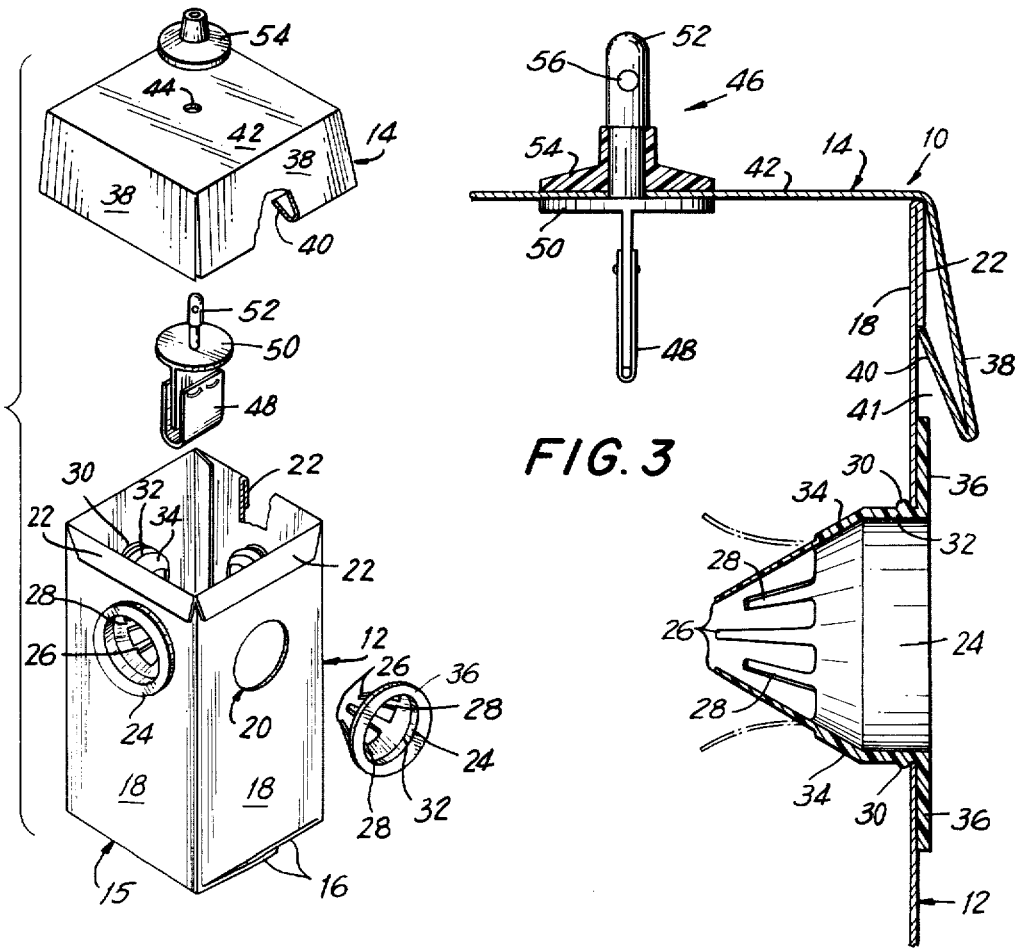

GYPSY MOTH TRAP

BACKGROUND OF THE INVENTION

The instant invention relates to a gypsy moth trap and more particularly to a gypsy moth trap employing frustoconical entry ports having a multiplicity of radial, flexible fingers.

The gypsy moth, Porthetria dispar (L.), a serious pest of trees in the northeastern United States, continues to threaten the nation's forest lands and homesites. Gypsy moth caterpillars strip the leaves from approximately one half million acres of timber a year. A single defoliation by caterpillars can kill evergreen trees; two defoliations kill hardwoods. This damage, coupled with necessary control measures, is very costly. It increases fire and erosion hazards, affects the flow of streams, reduces land and recreational values, destroys wildlife habitats, and is a general nuisance to residential and recreational areas. The cost and damage would spiral upwards if the gypsy moth were to spread to the West and South.

The gypsy moth develops in four stages- egg, caterpillar, pupa and moth. The insects pass the winter as egg masses attached to trees, leaves, stone walls, rocks and other shaded objects. Caterpillars hatch in late April or early May. They soon devour all the leaves in their vicinity (a caterpillar can eat one square foot of leaf each day). In late June, they enter the resting or pupal stage. Ten to fourteen days later the insects emerge as adult moths. The males emerge prior to the females.

It is at this stage of the life cycle that the moth trap helps to control the gypsy moth. The trap emits a scent, more powerful than that given off by the female, to attract males during mating. U.S. Pat. No. 3,018,219, the entirety of which is hereby incorporated by reference, discloses a most suitable synthetic attractant for the male gypsy moth. The male is drawn to the trap and is captured before he can fertilize the female moth. Each unfertilized female moth cannot produce offspring to defoliate trees the following spring.

It is quite clear that the utility of a gypsy moth trap is determined by the number of moths caught within the trap. Applicant has unexpectedly discovered that a particular combination of trap structure and entry port design is useful to capture significantly more moths than any other combination of trap structure and entry port design, including the trap depicted in Design U.S. Pat. No. 229,405, assigned to the assignee of the instant invention.

SUMMARY OF THE INVENTION

Accordingly, the instant invention provides a gypsy moth trap, which comprises a housing having a base and a multiplicity of apertures in the sides thereof, recessed frusto-conical entry ports engaged within the apertures having a multiplicity of radial, flexible fingers inwardly directed for easing entry into and impeding egress from the housing, means for covering and supporting the top of the housing and providing a shaded area adjacent the entry ports, and an attractant situated within the housing to attract the moths through the entry ports into the housing.

BRIEF DESCRIPTION OF THE DRAWING

FIG. 1 is a perspective view of a gypsy moth trap made according to the instant invention.

FIG. 2 is an exploded view of the trap shown in FIG. 1.

FIG. 3 is a substantially sectional view taken on the vertical plane indicated by the lines 3—3 of FIG. 1.

DESCRIPTION OF THE PREFERRED EMBODIMENT

In describing the preferred embodiment of the instant invention, reference is made to the drawings wherein FIG. 1 shows a gypsy moth trap generally designated 10 comprising a housing 12, and a dome 14 for covering the top of the housing 12. Both the housing 12 and the dome 14 are preferably formed from polyethylene-coated paperboard to withstand weathering elements. The base 15 of the housing 12 consists of four conventional flaps 16 which are folded inwardly. The housing 12 is shown as being square in cross-section and has four sides 18 each containing a circular aperture 20 (see FIG. 2) located near the top of the housing 12. As best seen in FIG. 3, the upper extremities of the sides 18 each include a flange 22 which is doubled back onto the outer surface of the side 18 and maintained thereon preferably by means of an adhesive (not shown).

Frusto-conical entry ports 24 having a multiplicity of alternating, flexible full and half fingers, 26 and 28 respectively, are held within the apertures 20 by means of a multiplicity of spaced locking beads 30. As best seen in FIG. 3, the entry port 24 is recessed within the aperture 20 and provides an annular crawling surface 32 perpendicular to the side 18. Adjacent the crawling surface 32 is a frusto-conical surface 34 from which the radial, flexible full and half fingers 26 and 38 extend. A rim 36 extending perpendicularly from the annular crawling surface 32 abuts against the housing side 18. Although the housing 12 may be almost any size, tests have indicated that an optimum size for the housing 12 is about 8½ inches high and about 4½ inches square, this size being sufficient to hold about a thousand gypsy moths.

Covering the top of the housing 12 is a dome 14 which provides a shaded area 41 adjacent the entry ports 24 by virtue of an overhanging, angular flange 38 situated just above the entry port 24. The moths appear to be attracted to the shaded area 41. Extending from the flange 38 and bent back thereon in a locking flap 40 which engages the lower edge of the flange 22 of the housing 12 so that the entire housing 12 is supported by the dome 14.

Disposed in the middle of the horizontal top 42 of the dome 14 is an opening 44 which receives a lure holder generally designated 46 which carries the lure 48 containing the gypsy moth attractant. The lure holder 46 should be formed from a material which does not absorb the gypsy attractant, and preferably should comprise a nylon. The lure 48 is preferably formed from paperboard. The lure holder 46 comprises a base portion 50 having an upstanding shank segment 52 passing through the opening 44 in the dome 14 and a closing cap 54 which abuts against the dome top 42, frictionally engages the shank 52 and overlies and protects the opening 44. The shank 52 includes a bore 56 located in the middle thereof. Cord (not shown) may be strung through the bore 56 for hanging the trap 10 from the branch of a tree or a clothesline, etc.

Experiments have shown that a preferred color for the outer surface of the trap, including the entry ports, for trapping a maximum amount of gypsy moths is yellow. It has also been found helpful to roughen or texturize the outer surfaces of both the trap and the entry port to provide better footing for the moths.

Tests have been conducted which indicate that the trap structure of the instant invention was the most effective of all trap structure tested in catching gypsy moths and that the fingered entry port of the instant invention was significantly more effective in trapping moths than any other of the entry ports tested. A test was run in three separate blocks. In the first block each respondent was given two of each of five types of traps, each trap having an entry port as shown in the drawings. An analysis of variance on those respondents with complete data showed that there was a significant difference between the traps at the 95 percent confidence level. It also showed that 57 percent of the variance in these data was accounted for by the difference in traps. The results of the test showed that the trap structure illustrated in the drawings captured 27.8 percent more moths than the next most efficient trap and 188 percent more moths than the least efficient trap. Each respondent was also given 8 of one type of trap, with one of each entry port/ pesticide combination. It should be point out, however, that the instant invention does not require a pesticide, since the fingers in the entry port are designed to impede the exiting of the gypsy moths. However, it should be noted that if a pesticide is used, then the fingers may be spaced with larger gaps since egress is not likely, or the half fingers may be omitted. It was found that there was a significant difference between entry port types, and that the fingered entry port shown in the drawings captured 104 percent more moths than the next most efficient entry port and 122 percent more moths than the least efficient entry port, the latter two entry ports lacking flexible fingers. Another test also showed that the trap structure shown in the drawings was responsible for catching 16.6 percent more moths than the next most efficient trap. It is quite clear from the data collected on the trap structure and the entry port design that the combination of trap structure and entry port design set forth herein is unexpectedly the most efficient combination for capturing gypsy moths.

It is thought the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. A trap for flying insects comprising: a housing, including a base having an upstanding sidewall with at least two apertures to the interior of said housing, said apertures being oppositely disposed on said sidewall; a one-way gate member mounted on said sidewall within each of said apertures thereof, said gate member including means for mounting on said sidewall, a generally frustoconical, inwardly tapered inner portion comprised of a multiplicity of resiliently deformable fingers projecting into said housing, and a short, generally circular wall portion coaxially positioned between said mounting means and said inner portion, said fingers permitting ready entry of insects into said housing and impeding their egress therefrom, and said circular wall portion providing a crawling surface on which such insects may conveniently alight and from which they may readily proceed through said frustoconical portion into said housing; a scent-producing attractant disposed within said housing on a path substantially between said oppositely disposed apertures, so that air currents flowing along said path may readily carry the scent of said attractant to the outside of said housing; and covering means engaged adjacent the upper end of said sidewall and substantially closing said base.

2. The trap of claim 1 wherein said covering means is disposed to shade each of said apertures.

3. The trap of claim 2 wherein every other finger is a half finger.

4. The trap of claim 3 wherein the color of the gate members and the outer surface of the trap is yellow.

5. The trap of claim 4 wherein the covering means comprises a dome having an overhanging, angular flange situated above the gate members.

6. The trap of claim 5 wherein the housing and the dome are formed from polyethylene-coated paperboard.

7. The trap of claim 6 wherein the outer surfaces of both the trap and the gate members are roughened or texturized.

8. The trap of claim 7 additionally comprising a lure containing the attractant, and a lure holder carrying the lure, said lure holder being mounted through an opening in the top of the dome.

* * * * *